Jan. 1, 1935.  G. B. WARREN  1,985,964
ELASTIC FLUID TURBINE
Filed Sept. 13, 1932   2 Sheets-Sheet 1

Inventor:
Glenn B. Warren,
by Charles E. Tuller
His Attorney.

Jan. 1, 1935.     G. B. WARREN     1,985,964
ELASTIC FLUID TURBINE
Filed Sept. 13, 1932     2 Sheets-Sheet 2

Inventor:
Glenn B. Warren
by Charles E. Tullar
His Attorney.

Patented Jan. 1, 1935

1,985,964

UNITED STATES PATENT OFFICE 1,985,964

ELASTIC FLUID TURBINE

Glenn B. Warren, Schenectady, N. Y., assignor to General Electric Company, a corporation of New York Application September 13, 1932, Serial No. 632,932

8 Claims. (Cl. 253—69)

The present invention relates to elastic fluid turbine drives for airplanes and the like, although it is not necessarily limited thereto.

Many problems are encountered in the construction of elastic fluid turbines for driving airplane propellers or the like not met with in the usual turbine constructions. These problems are partly due to the necessity of making such turbines as light as possible which leads to very high turbine speed, in the order of 10,000 to 20,000 R. P. M., for example. Since at such high speeds the turbine cannot be connected directly to the propeller or apparatus to be driven thereby, special speed reducing means have to be provided.

One object of my invention is to provide an improved elastic fluid turbine drive including a reduction gearing which is light in weight and compact in structure.

A further object is to provide an improved attachment of such a unit to an aircraft whereby vibrations of the different parts have little effect on the unit itself as well as the aircraft.

Another object of my invention is to provide a flexible arrangement between certain parts of the elastic fluid turbine as well as between certain parts of the turbine and the reduction gearing to permit relative expansion between these parts, this being important owing to the high temperature and high pressure of the elastic fluid in the first stages of the turbine.

A further object of my invention is to provide an improved arrangement for the turbine inlet or chest to permit a simple and reliable regulation of the elastic fluid admitted to the turbine.

Still another object of my invention is to provide an improved arrangement for the intermediate fluid directing means located between the two rows of buckets on the first stage wheel of the turbine.

For a consideration of what I believe to be novel and my invention, attention is directed to the following description and the claims appended thereto, in connection with the accompanying drawings forming a part of my specification.

Figure 1:
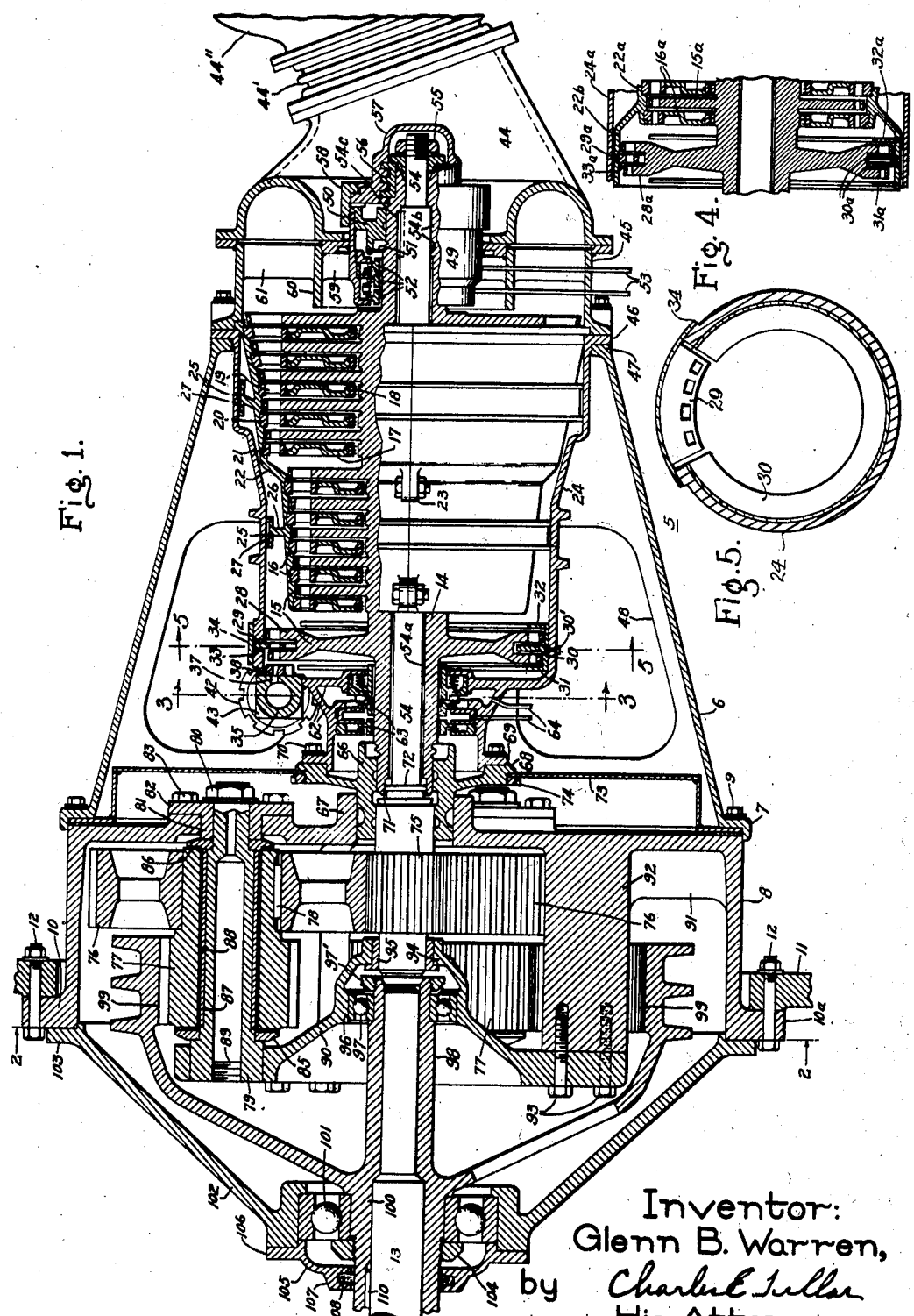
Figure 2:
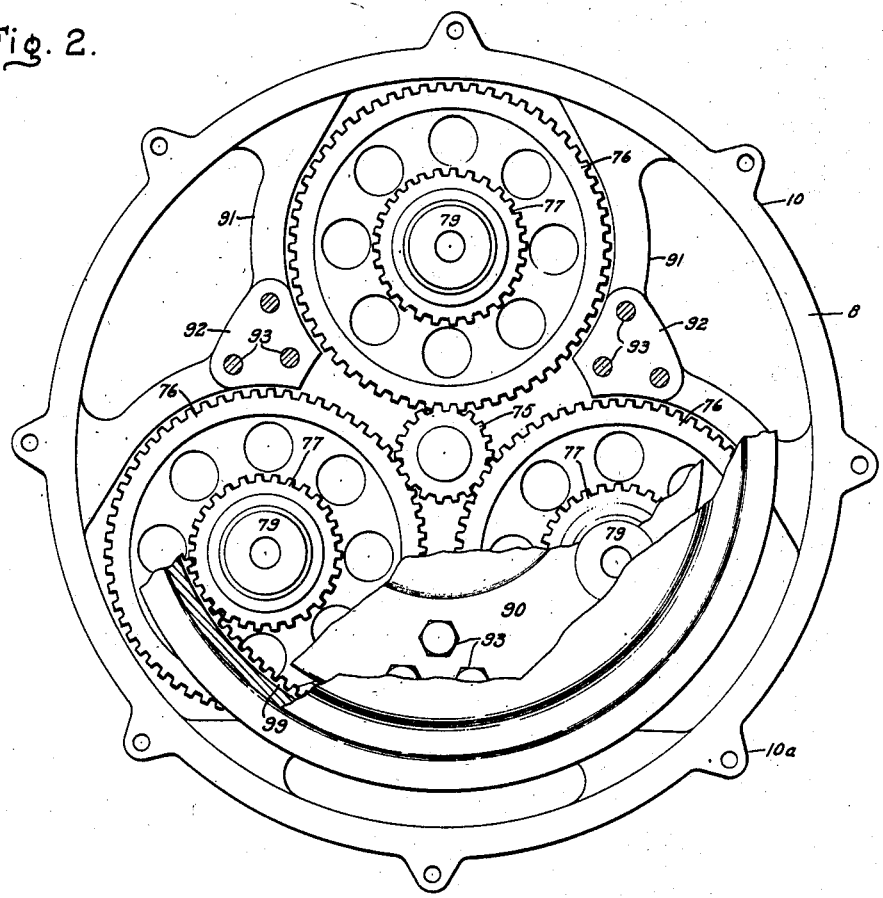
Figure 3:
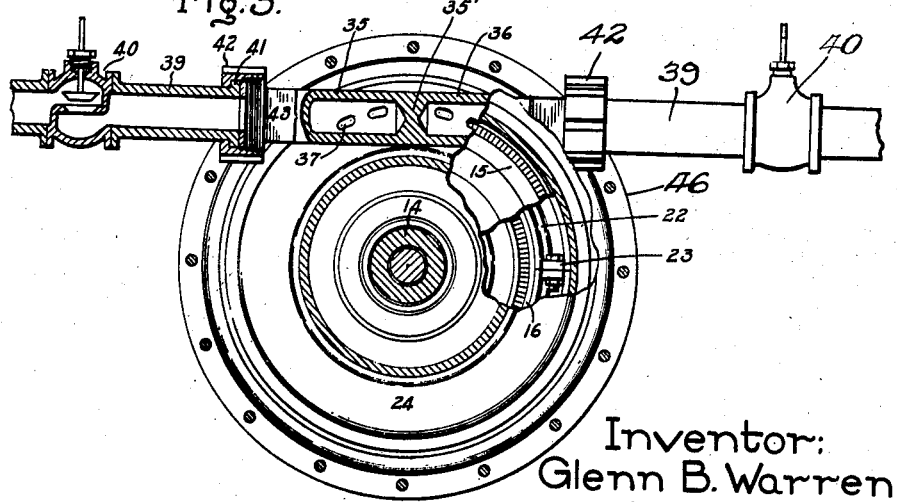

In the drawings, Fig. 1 is a longitudinal sectional view of an elastic fluid turbine construction embodying my invention; Fig. 2 is a front view with the reduction gearing partly broken away and seen along line 2—2 of Fig. 1; Fig. 3 is a front view, partly in section and partly broken away, of the elastic fluid turbine along line 3—3 of Fig. 1; Fig. 4 is a detail view of a modification thereof, and Fig. 5 is a sectional view along line 5—5 of Fig. 1.

Referring to the drawings, where I have illustrated a turbine drive particularly adapted for aircrafts, 5 represents an elastic fluid turbine including a support 6 having a flanged portion 7 fastened to the casing 8 of a reduction gearing by means of bolts 9. According to my invention I provide one of these parts, that is, either the turbine support or the casing of the reduction gearing with means for fastening the entire unit to the aircraft. In the present instance I have shown reduction gear casing 8 as being provided with a flanged portion 10 having a plurality of lugs 10a (Fig. 2) for fastening the flange to a ring 11, preferably of annular shape and forming a part of the airplane structure. The unit is fastened to the supporting ring 11 by means of bolts 12. 13 designates the propeller shaft for driving a propeller (not shown). Thus the entire arrangement comprising the turbine and the reduction gear with the propeller shaft forms a single unit which can be easily attached to the aircraft. One part only of this unit, in the present instance the reduction gear casing, is fastened to the aircraft and in turn forms a support for the other part, in the present instance the elastic fluid turbine. With such an arrangement the turbine is free to expand relatively to the gearing without setting up high stresses between the two and the aircraft.

Referring more specifically to my elastic fluid turbine arrangement, I have shown in the drawings a construction including a hollow turbine shaft 14, termed usually a quill shaft, provided with a plurality of bucket wheels 15 which in the present instance are made together with the shaft from a single piece or block of steel or like material. Provided between each pair of adjacent bucket wheels is a diaphragm 16 for conveying the elastic fluid in the proper direction and at the proper speed from a higher stage to the next lower stage. The diaphragms include an inner disk member 17 which is punched or pressed from sheet metal so that its outer portion defines a U-shape with the bottom of the U close to the succeeding lower stage, whereas the inner part forms a U shape inverted with respect to the first U shape, that is, with the bottom of the U close to the preceding higher stage. The grooves defined by the U shapes run coaxial to the turbine shaft. From another viewpoint the diaphragm disk is pressed or punched so that each half has an S like cross section for causing high strength and lightness of the disk. Fastened to the inner portion of the diaphragm disks are packing carrying members 18 and welded to the outer portion are nozzle defining partitions and shroud rings 19 and 20 respectively of which the outer shroud ring 20 serves to hold the diaphragms in grooves 21 of the inner shell or casing 22.

The inner turbine casing is split along a horizontal line and provided near the horizontal line with flanges 23 for holding the two casing halves together. 24 represents a solid outer casing or shell. The inner shell is supported by the outer shell through ring members 25 united with the inner shell by webs 26. This arrangement permits relative expansion, particularly in axial direction between the inner and outer shell. To facilitate this relative expansion I provide the ring members 25 with annular recesses 27 so that a comparatively small surface of the ring members 25 bears against the inner surface of the outer shell.

The first stage of the turbine has been shown as including a double row wheel 28 of the impulse type with a segment of intermediate fluid directing means, termed usually "intermediates", 29 between the two rows. This intermediate segment 29 extends over a section of the bucket wheel. To prevent the formation of undesirable elastic fluid currents known as windage, I provide between the two rows of the double row velocity stage wheel a shield 30 extending over a sector of the wheel not covered by intermediates 29. In the present instance I have shown shield 30 as being united with two other shields 31 and 32 facing the inlet side of the first row of buckets and the outlet side of the second row of buckets respectively. The three windage shields 30, 31 and 32 thus form a single member which in the present instance is held in position by means of screws 30' inserted through the outer casing 24. During assembly the windage shield unit is slid into the outer casing together with the double row wheel 28.

The segment of intermediates 29 is carried by a plate 34 fastened to the outside of the turbine casing. Segment 29 is inserted through an opening 33 in the outer casing and is secured to the casing by suitable means together with plate 34 to the turbine casing. Segment 29 and plate 34 are assembled on the turbine casing after the inner turbine shell together with the rotor have been slid into the outer turbine casing.

In Fig. 4 I have shown a modified arrangement for holding the segment of intermediates for the double row wheel. According to this construction the inner casing 22a corresponding to casing 22 of Fig. 1 has an extension 22b projecting in axial direction beyond the inlet side of the first stage so that it embraces the double row wheel 28a. Instead of inserting the segment of intermediates for directing the fluid from the first row of buckets to the second row of buckets of the double row wheel through a slot in the outer casing, as shown in Fig. 1, I provide according to this modified arrangement the projecting portion of the inner casing with an internal recess or groove 33a which in substance corresponds to the slot 33 in the outer casing of Fig. 1, and I hold the outer portion of the segment of intermediates 29a within this recess by any suitable means such as welding, soldering or brazing. The segment of intermediates 29a covers a portion only of the bucket wheel 28a. In order to prevent windage I provide shields which may be of sheet metal. In Fig. 4 in the present instance I have shown two shields 30a between the two rows of buckets of the double row wheel with their outer portions inserted into internal recesses of the projecting portion 22b of the inner casing. Similarly I provide near the entrance side of the first row of buckets as well as near the exit side of the second row of buckets shields 31a and 32a respectively, corresponding to shields 31 and 32 respectively of Fig. 1. To permit ready assembling of the shields I split them along a horizontal line through the axis of the turbine similar to the splitting of the turbine diaphragms. This arrangement has the advantage that it permits the complete assembling of the inner turbine shell 22 with the bucket wheels including the double row wheel on the shaft after which all these assembled parts are slid into the outer casing 24.

The steam inlet for the turbine, as shown in Figs. 1 and 3, comprises a conduit having two parts 35 and 36, integrally united with each other, and having walls provided with openings 37 leading to a plate 38 (Fig. 1) having nozzles which direct elastic fluid to the first row of buckets of the first stage wheel 15. The nozzle plate 38 is held preferably by a weld to the inlet conduit with its nozzles in alignment with openings 37. The inlet conduit extends transversely to the axis of rotation and is arranged at an opening of the outer casing and welded to the walls defining this opening, thus forming a part of the outer casing. The interior of conduit parts 35 and 36 is divided by a wall 35' integrally formed with said parts for permitting the admission of elastic fluid through some of the inlet nozzles 37 only. Fastened to each part of the inlet conduit is a conduit 39 including a valve 40 for controlling the admission of elastic fluid. Conduit 39 and part 35 have flanged end portions 41 engaging each other. A nut or like coupling member 42 serves for fastening the two conduits 35 and 39 together. A portion 43 of conduit 35 adjacent its threaded portion is rectangular in cross-section to permit the holding of this conduit by means of a wrench while nut 42 is applied. This is advantageous as it permits tightening of conduit 39 to part 35 without imparting excessive torsional forces to part 35.

During operation, steam or like elastic fluid is admitted either through both conduit parts 36 and 37 or through one part only, as desired. The buckets of the first wheel cause the transformation of a part of the velocity energy of steam passing therethrough into mechanical energy which latter is transmitted to the turbine shaft. The steam passes through the successive stages of the turbine until it reaches an exhaust hood 44 whence it is supplied to a condenser 44" connected to the exhaust hood 44 by means of a flexible, flanged member 44'. The provision of an elastic connecting means between the turbine and the condenser permits relative expansion between the two parts and furthermore prevents vibrations of the turbine from being imparted to the condenser. In order to make the bearing at the exhaust end accessible, I provide preferably an exhaust hood with two outlets one on each side of the bearing. In the drawings I have shown in Fig. 1 a single exhaust outlet arranged in the rear of the turbine bearing. A cylindrical flanged member 45 has one end fastened to hood 44 by any suitable means and another end secured to a flange 46 of the outer turbine shell and a flange 47 of support 6.

The support is preferably made of an alloy to reduce the weight of the structure and provided with openings 48 for permitting access to the inlet and to the bearing of the turbine.

49 designates a bearing and packing support for the exhaust end of the outer turbine shaft. 50 is a journal held in position by the bearing support and including a packing 51 for preventing leakage of oil along the bearing shaft. 52 are elastic fluid packing members of the floating type provided at the left-hand end of journal 50 and supported by member 49. Steam or like fluid leaking along the outer surface of the turbine shaft is drained off from the annular spaces defined between the packings by means of pipes 53. The quill or turbine shaft telescopes a pinion shaft 54 which has a portion rigidly fastened to the quill shaft. Other portions of the quill and pinion shafts define a clearance 54a for permitting relative expansion between the turbine and the pinion shaft and for preventing heat from being transmitted therebetween, and at the same time providing a flexible connection between the turbine and the gearing. In the present instance I have shown the portions 54b of the turbine or quill shaft and the pinion shaft engaging each other as being located within the exhaust bearing support for the turbine shaft. These portions are rigidly secured to each other by means of keys 54c representing means for transmitting torque from the turbine to the pinion shaft. A part of the end portion of the pinion shaft is shouldered or reduced in diameter and located within a corresponding hole in the turbine shaft. A nut 55 is applied to a screw-threaded part of the shouldered portion for rigidly fastening the two shafts together and for preventing the pinion shaft from axial movement. The axial thrust of the turbine is taken up by a thrust bearing 56 held by a cup 57. The latter encloses the ends of the pinion and turbine shafts and is supported by an inwardly flanged nut 58 having an inner screw-threaded portion engaging an outer screw-threaded end portion of the bearing supporting member 49. Parts 50 to 58 are held by the support 49 which is rigidly secured to the cylindrical flanged member 45, in the present instance, through webs 59 welded to a ring 60 which in turn is welded to the inner ends of other webs 61 having their outer ends integrally united to the inner surface of the cylindrical flanged member 45.

The left-hand end of the outer turbine casing has inwardly projecting walls 62 defining supporting means for packings 63 serving to prevent leakage of steam along the outer turbine shaft. Adjacent packing rings define annular chambers from which leakage fluid is drained through pipes 64.

The left-hand end of turbine shaft 14 adjacent packings 63, as well as a portion of the pinion shaft, are supported by a journal 66 carried by a flanged inner wall portion 67 of the gearing casing. A flanged portion 68 of the journal is fastened to a flanged portion 69 of the left-hand end of the outer turbine casing by means of bolts 70. The shouldered portion of the pinion shaft faces the end of the turbine shaft and is spaced therefrom to permit relative axial displacement between the two shafts. The increased diameter of the shouldered portion of the pinion shaft is equal to the diameter of the adjacent end of the quill shaft. This permits a convenient and simple arrangement of a common journal for both shafts. An important feature of the arrangement is that it provides for relative expansion of the different parts, that is, the turbine shaft may expand in axial direction relatively to the pinion shaft. The flanged portion 67 defines a bearing for journal 66, permitting the latter to slide axially within this bearing. This permits the outer turbine casing carrying journal 66 to expand in an axial direction without affecting the gearing casing.

In order to prevent oil or like lubricant for journal 66 from entering the annular space defined between the pinion and turbine shafts, I provide a packing 72 between a portion of the pinion shaft and the recessed end portion of the turbine shaft. The provision of a packing at this point is important as the high temperatures existing within the hollow turbine shaft would cause carbonization of the lubricant. 73 designates a flexible shield having an inner portion fastened to the flanged journal portion 68 by means of a nut 74 and an outer portion fastened to the joint between support 6 and the outer gearing casing 8 for shielding the reduction gear from the turbine. Shield 73 prevents oil leaking through the gearing casing from coming into contact with the turbine.

Referring now more specifically to the reduction gearing, casing 8 having a flanged inner wall portion 67 defines a support for the turbine with the high pressure end of the latter directly supported by the flanged wall portion of the casing and the exhaust end indirectly through support 6 fastened to an outer portion of the inner end wall. On the pinion shaft which extends beyond journal 66 into the gearing casing is a pinion 75 rigidly fastened to the shaft by any suitable means, not shown. Meshing with pinion 75 are three gears 76, more clearly shown in Fig. 2. Each of these gears is rigidly secured to a pinion 77 by means of a key 78 between the gear and an annular extension of pinion 77. Thus, gears 76 and pinions 77 define gear units driven by pinion 75 from the turbine shaft. Each of the units is supported by a spindle or bearing comprising a hollow shaft 79 having its right-hand end portion screw-threaded and fastened by means of a nut 80 to a bushing 81 which in turn has an outer flanged portion 82 fastened to the inner end wall of the gearing casing by means of bolts 83. 85 and 86 are rings engaging shouldered portions at the left and right-hand ends respectively of journal 79, having inner bearing surfaces for the gear unit. In order to obtain smooth running and to decrease the wear of the units I provide the outer surface of the spindle with a special bushing 87 and the inner surface of the unit with a lining 88 of bearing metal. Journals 79 have been made hollow to decrease the weight thereof, and their left-hand end portions are provided with an internal screw-thread 89 for permitting the hollow spaces to be closed by suitable plugs, not shown.

90 designates a casting supported by three posts 92 projecting from the inner end wall of reduction gearing casing 8. 91 are webs between said posts and the outer casing wall. Three portions of casting 90, symmetrically located with respect to the circumference of the casting, are fastened to posts 92 by means of bolts 93. The casting has three openings located symmetrically with respect to bolts 93 for receiving the ends of spindles 79. The latter therefore, are supported at both ends by the reduction gearing casing, the right-hand ends being directly supported by the inner end wall of the casing and the left-hand ends being supported through casting 90 by the posts 92. From another viewpoint, the casting forms a means for maintaining the left-hand ends of the spindles in properly spaced relation. An inner portion 94 of the casting is provided with a bearing bushing 95 for supporting the left-hand end portion of the pinion shaft. With this arrangement the shaft portion carrying pinion 75 running at turbine speed and transmitting the total torque of the turbine, is supported at both sides of the pinion. Another inner portion 96 of casting 90 defines a support for a ball-bearing 97 for a hub portion 98 of an internal gear 99 driven by the gear units through pinions 77 forming members of said units. 97' designates a nut fastened to the screw-threaded end portion of hub 98 for retaining the ball-bearing in its position. The three pinions 77 meshing with the internal gear 99 are symmetrically spaced with respect to the pinion shaft, whereby the gear units cause equal distribution of load on the internal gear. The radial forces between the internal gear and pinion 75 acting towards the bearings of these parts balance each other. The left-hand hub portion 100 of internal gear 99 is supported by means of a ball-bearing 101 held in a recess of an end plate or outer end wall 102 of the reduction gearing. An outer portion 103 of the end plate is flanged and centrally held at the outer wall of gearing casing 8. 104 designates a nut engaging a screw-threaded portion of the left-hand hub member of the internal gear for retaining ball-bearing 101 in position. 105 is a ring member having an outer flanged portion 106 for fastening this member to end plate 102, and an inner recessed portion 107 for containing a packing 108 to prevent leakage of lubricant from ball-bearing 101. The shaft 13, representing a means driven by the gearing which may serve to drive a propeller or the like, is fastened to the hub portions of the internal gear by means of a key 110.

What I claim as new and desire to secure by Letters Patent of the United States, is:

1. In an elastic fluid turbine, a shaft, a first double row bucket wheel fastened to the shaft, a casing having a projecting portion embracing the bucket wheel, means for supplying live elastic fluid to the first row of buckets, an intermediate fluid directing segment provided in a slot through the projecting portion, said segment being provided between the two rows of buckets and covering a sectional portion of the wheel, a shield held in an internal groove of the projecting portion covering another sectional portion of the wheel for preventing windage, and means on the outside of the casing for holding the segment and the shield.

2. In an elastic fluid turbine, a shaft, a double row bucket wheel fastened to the shaft, a casing having a projecting portion embracing said wheel, an intermediate segment between the two rows of the wheel held in a slot through the projecting portion, shield means fastened to the projecting portion, shield means fastened to the casing for preventing windage, the outer casing including a conduit and a nozzle plate having nozzles registering with openings in the conduit for directing elastic fluid to the first row of the wheel.

3. In an elastic fluid turbine, an inner casing comprising two halves and means for holding the two halves together, ring members coaxially arranged with the inner casing and united therewith, an outer solid casing for supporting the inner casing with the outer surfaces of the ring members engaging the inner surface of the outer casing, the ring members having grooves cut into their outer surfaces so that a small portion only of the outer surfaces engages the outer casing, a bucket wheel ahead of the inner casing as regards the direction of flow of elastic fluid through the turbine, and means for directing fluid to the bucket wheel.

4. In an elastic fluid turbine, an inner casing comprising two halves and means for holding the two halves together, ring members coaxially arranged with the inner casing and united therewith, an outer solid casing for supporting the inner casing with the outer surfaces of the ring members engaging the inner surface of the outer casing, a double row wheel ahead of the inner casing as regards the direction of flow of elastic fluid through the turbine, and an intermediate segment between the two rows of the double row wheel fastened to the outer casing.

5. In an elastic fluid turbine, a rotor including a shaft, a casing, bearings for the rotor held by the casing, and means for supporting the casing including a journal slidably engaging one of said bearings to permit relative expansion between the casing and said supporting means.

6. In an elastic fluid turbine, a turbine casing, a turbine shaft, bucket wheels supported by the turbine shaft, means driven by the turbine comprising a driven shaft within a bore of the turbine shaft having one end portion fastened to the turbine shaft and another end portion extending beyond the turbine shaft, said other end portion defining a shoulder facing the end surface of the turbine shaft and being spaced therefrom, and a bearing for the shouldered portion of the driven shaft and the end portion of the turbine shaft, said bearing including a journal fixed to the turbine casing and a support slidably engaging the journal.

7. In a turbine drive, an elastic fluid turbine having a pinion shaft and a turbine shaft telescoping the pinion shaft, one portion of the pinion shaft being fastened to a portion of the turbine shaft for permitting transmission of torque from the turbine shaft to the pinion shaft, a wall with a flanged portion adjacent the turbine, a bearing for the pinion and turbine shafts supported by the flanged portion of the wall, the pinion shaft having a portion extending through the wall and a pinion fastened to the extending portion.

8. In an elastic fluid turbine, a shaft, a bucket wheel fastened to the shaft, an integrally formed turbine casing having a slot, a fluid directing means inserted from outside through the slot in the casing for directing fluid to the wheel, and a member provided outside the casing for holding the fluid directing means.

GLENN B. WARREN.